United States Patent Office 3,421,829
Patented Jan. 14, 1969

3,421,829
PROCESS FOR COLOURING AROMATIC POLYESTER AND CELLULOSE ACETATE TEXTILE MATERIALS WITH WATER-INSOLUBLE DISAZO DYESTUFFS
George Arthur Bennett, Alistair Howard Berrie, and Raymond Windle, Manchester, England, assignors to Imperial Chemical Industries Limited, London, England, a coporation of Great Britain
No Drawing. Continuation-in-part of application Ser. No. 366,139, May 8, 1964. This application Nov. 13, 1967, Ser. No. 682,519
Claims priority, application Great Britain, June 21, 1963, 24,811/63; Mar. 23, 1964, 12,191/64
U.S. Cl. 8—41   7 Claims
Int. Cl. D06p 1/18

ABSTRACT OF THE DISCLOSURE

Coloration of aromatic polyester or cellulose acetate textile materials with an aqueous dispersion of a water-insoluble disazo dyestuff obtained by coupling a tetrazotised benzidine with 2 molecular proportions of a para coupling phenol.

---

This application is a continuation-in-part of our application Ser. No. 366,139 which was filed in the United States Patent Office on May 8, 1964, now abandoned.

This invention relates to a colouring process and more particularly it relates to a process for colouring aromatic polyester or cellulose acetate textile materials.

According to the invention there is provided a process for colouring aromatic polyester or cellulose acetate textile materials which comprises treating said textile materials with an aqueous dispersion of a water-insoluble disazo dyestuff of the formula:

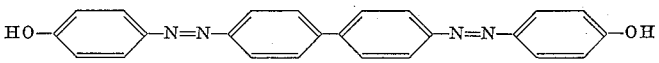

and any substituents on the benzene rings are selected from the class consisting of chlorine, fluorine, bromine, lower alkyl and lower alkoxy.

Throughout this specification the terms lower alkyl and lower alkoxy are used to denote alkyl and alkoxy radicals respectively containing from 1 to 4 carbon atoms, in particular methyl and methoxy radicals.

The water-insoluble disazo dyestuffs used in the process of the invention can be obtained by coupling a tetrazotised benzidine with two molecular proportions of a phenol or with one molecular proportion of each of two different phenols which couple in para position to the hydroxy group and wherein the benzidine and the phenol may optionally contain one or more chlorine, fluorine or bromine atoms or lower alkyl or lower alkoxy radicals.

As specific examples of optionally substituted benzidines which may be used to obtain the said disazo dyestuffs there may be mentioned benzidine (4:4'-diaminodiphenyl), 3:3'-dichlorobenzidine, 3:3'-dibromobenzidine, 3:3'-dimethylbenzidine, dianisidine (3:3'-dimethoxy-4:4'-diaminodiphenyl), 2:5:2':5' - tetrachlorobenzidine, 2:3:2':3' - tetramethylbenzidine, 2:2' - dimethyl-5:5'-dimethoxybenzidine, 2:2'-dimethoxybenzidine, octafluorobenzidine, 2:2'-dichloro-5:5'-dimethoxybenzidine and 2:2:2':5'-tetramethoxybenzidine.

As specific examples of the said phenols there may be mentioned phenol itself and o-cresol, m-cresol, o-chlorophenol, m-chlorophenol, 2:5-dichlorophenol, 2:5-dimethylphenol and 2:5-dimethoxyphenol.

The process of the invention may be conveniently carried out by immersing the textile material in a dyebath comprising an aqueous dispersion of a water-insoluble dyestuff, as hereinbefore defined, the dispersion being stabilised if desired by dispersing agents such as sulphonated naphthalene-formaldehyde condensates. The dyebath may be heated to a temperature conveniently used for dyeing the particular textile material. Thus for dyeing aromatic polyester textile materials such as polyethylene terephthalate the dyebath may be heated at or near the boiling point, with the addition of a carrier such as diphenyl or o-hydroxydiphenyl, or it may be heated at a temperature above 100° C., preferably at a temperature between 100° and 130° C. in a closed vessel, with or without the addition of a carrier. For dyeing cellulose triesters such as cellulose triacetate the dyebath is preferably heated at or near the boiling point, and for dyeing secondary cellulose acetate the dyebath is preferably heated at 60° to 85° C.

Alternatively an aqueous dispersion of the said dyestuff may be padded on to an aromatic polyester or cellulose triester textile material and fixed by baking the material, for example by heating for 1 to 2 minutes at between 180° and 220° C. The padding liquid may advantageously contain a thickener or migration inhibitor and other additives such as urea.

If desired, the process of the invention may also be carried out by applying to the surface of the textile material a thickened printing paste containing an aqueous dispersion of the water-insoluble azo dyestuff, and subsequently steaming, or baking in the case of polyester or cellulose triester materials. Suitable thickening agents include gum tragacanth, gum arabic, Nafka crystal gum, alginates, or oil-in-water or water-in-oil emulsions. The printing paste may also contain commonly used adjuvants such as surface active agents and sodium m-nitrobenzene sulphonate.

If desired, mixtures of the hereinbefore defined dyestuffs with each other or with other disperse dyestuffs may be used in carrying out the process of the invention.

After carrying out the process of the invention the textile material may be removed from the dyebath, steamer or baker, rinsed and treated with soap or synthetic detergent. It is also advantageous to treat the coloured aromatic polyester textile material with a weak alkaline solution of sodium hydrosulphite before soaping, since this helps to remove loosely attached dyestuff from the surface of the fibres.

As an example of an aromatic polyester textile material which can be coloured by the process of the invention there may be mentioned a polyethylene terephthalate textile material, and as examples of cellulose acetate textile materials there may be mentioned cellulose triacetate and secondary cellulose acetate textile materials. The textile materials may be in the form of thread, yarn or woven or knitted fabric.

The process of the invention provides a means whereby aromatic polyester or cellulose acetate textile materials may be coloured in yellow to orange shades of good fastness to washing and to dry heat treatments.

The invention is of great value when applied to the coloration of polyethylene terephthalate textile materials, on which the dyestuffs used have excellent building up properties, so enabling deep shades to be obtained, and the colorations are fast to light and also to dry heat treatments under such conditions as are encountered in pleating operations.

One preferred class of the water-insoluble disazo dyestuffs for use in the process of the invention comprises the disazo dyestuffs of the formula:

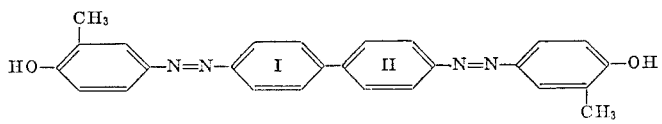

and the benzene rings I and II are optionally substituted by chlorine, bromine or fluorine atoms or by methyl or methoxy groups.

When applied to aromatic polyester textile materials the dyestuffs of this preferred class have good build-up and excellent fastness to severe dry heat treatments and there is little or no staining of any adjacent white materials used in the said dry heat treatments.

The invention is illustrated but not limited by the following examples in which the parts are by weight.

EXAMPLE 1

A dyebath is prepared by milling 1 part of 4:4'-bis(4''-hydroxyphenylazo)-3:3'-dichlorodiphenyl with 80 parts of water containing 3 parts of the sodium salt of a sulphonated naphthalene-formaldehyde condensate, and adding the resulting dispersion to 4000 parts of water containing 1 part oleyl sodium sulphate. 100 parts of polyethylene terephthalate fabric are placed in the dyebath which is then heated at 130° C. for 30 minutes in a closed vessel. The polyethylene terephthalate fabric is then rinsed in water and immersed for 15 minutes at 50° C. in an aqueous solution containing 0.2% sodium hydroxide, 0.2% sodium hydrosulphite and 0.1% cetyl trimethyl ammonium bromide. The fabric is again rinsed in water and then immersed for 15 minutes in a warm aqueous solution of a synthetic detergent, rinsed in water, and finally dried.

The polyethylene terephthalate fabric is dyed a yellow shade having good fastness to heat treatments and to light.

In place of the 1 part of the diazo dyestuff used in Example 1 there are used equivalent amounts of the azo dyestuffs which are obtained by tetrazotising the diamines listed in the second column of the table and coupling the resulting tetrazo compound with two molecular proportions of the coupling components listed in the third column of the table. The corresponding line in the fourth column of the table indicates the shade obtained when the resulting dyestuff is applied from an aqueous dispersion to an aromatic polyester textile material.

| Example | Diamine | Coupling Component | Shade |
|---|---|---|---|
| 2 | Benzidine | Phenol | Yellow. |
| 3 | 3:3'-dimethoxybenzidine | do | Reddish-yellow. |
| 4 | Benzidine | o-Cresol | Orange. |
| 5 | 3:3'-dichlorobenzidine | do | Reddish-yellow. |
| 6 | do | Mixture of equal parts of phenol and o-Cresol | Do. |
| 7 | do | o-Methoxyphenol | Do. |
| 8 | Benzidine | do | Yellow. |
| 9 | 3:3'-dichlorobenzidine | o-Chlorophenol | Reddish-yellow. |
| 10 | do | 2:6-dimethylphenol | Do. |
| 11 | do | 5-chloro-2-methylphenol | Do. |
| 12 | do | 2:5-dimethylphenol | Do. |
| 13 | do | 3:5-dimethylphenol | Do. |
| 14 | 2:5:2':5'-tetrachlorobenzidine | Phenol | Yellow. |
| 15 | do | o-Chlorophenol | Do. |
| 16 | 2:3:2':3'-tetrachlorobenzidine | o-Cresol | Do. |
| 17 | do | Phenol | Do. |
| 18 | 2:3:2':3'-tetramethylbenzidine | o-Chlorophenol | Do. |
| 19 | 2:2'-dimethyl-5:5'-dimethoxybenzidine | do | Do. |
| 20 | do | Phenol | Do. |
| 21 | do | o-Cresol | Do. |
| 22 | 2:2'-dimethoxybenzidine | do | Do. |
| 23 | do | Phenol | Do. |
| 24 | do | o-Chlorophenol | Do. |
| 25 | 2:2'-dichloro-3:3'-dimethylbenzidine | do | Do. |
| 26 | do | Phenol | Do. |
| 27 | do | o-Cresol | Do. |
| 28 | 2:2'-dichloro-5:5'-dimethoxybenzidine | do | Do. |
| 29 | do | Phenol | Do. |
| 30 | do | o-Chlorophenol | Do. |
| 31 | 2:5:2':5'-tetrachlorobenzidine | o-Cresol | Do. |
| 32 | 2:3:2':3'-tetramethylbenzidine | 2-methyl-5-chlorophenol | Do. |
| 33 | 2:5:2':5'-tetramethoxybenzidine | o-Chlorophenol | Do. |
| 34 | do | 2-methyl-5-chlorophenol | Do. |
| 35 | do | Phenol | Do. |
| 36 | Octafluorobenzidine | do | Do. |
| 37 | do | o-Cresol | Do. |
| 38 | Benzidine | 2-methyl-5-chlorophenol | Do. |
| 39 | 2:2'-dichlorobenzidine | Phenol | Do. |
| 40 | do | o-Cresol | Do. |
| 41 | 3:3'-dibromobenzidine | do | Do. |

EXAMPLE 42

100 parts of a woven cellulose triacetate textile material are immersed in a dyebath comprising a dispersion of 1 part of 3:3'-dichloro-4:4'-di(3''-methyl-4''-hydroxyphenylazo)diphenyl in 3000 parts of water containing 3 parts of the sodium salt of a sulphated cetyl/oleyl alcohol mixture, and the dyebath is then heated at 98° C. for 1 hour. The dyed cellulose triacetate textile material is then removed from the dyebath, rinsed in water and dried.

The cellulose triacetate is thereby dyed a deep reddish-yellow shade possessing good fastness to light and excellent fastness to steam-pleating processes.

We claim:
1. Process for colouring textile materials selected from the class consisting of aromatic polyester and cellulose acetate textile materials which comprises treating said textile materials with an aqueous dispersion of a water-insoluble disazo dyestuff of the formula:

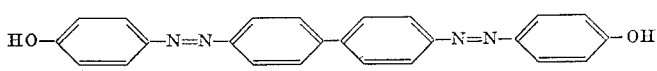

and any substituents on the benzene rings are selected from the class consisting of chlorine, bromine, fluorine. lower alkyl and lower alkoxy.

2. Process as claimed in claim 1 wherein the textile material is a polyethylene terephthalate textile material.

3. Process as claimed in claim 1 wherein the water-insoluble disazo dyestuff is a disazo dyestuff of the formula:

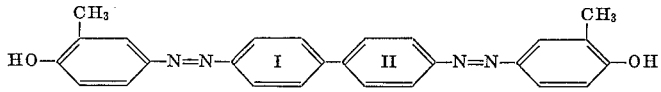

and any further substituents on the benzene rings I and II are selected from the class consisting of chlorine, fluorine, bromine, methyl and methoxy.

4. Process as claimed in claim 1 wherein the water-insoluble disazo dyestuff is 3:3'-dichloro-4:4'-bis(3"-methyl-4"-hydroxyphenylazo)diphenyl.

5. Process as claimed in claim 1 wherein the water-insoluble disazo dyestuff is 3:3'-dichloro-4:4'-bis(4"-hydroxyphenylazo)diphenyl.

6. Process as claimed in claim 1 wherein the water-insoluble disazo dyestuff is 4:4'-bis(4"-hydroxyphenylazo)diphenyl.

7. Process as claimed in claim 1 wherein the water-insoluble disazo dyestuff is 3:3'-dimethoxy-4:4'-bis(4"-hydroxyphenylazo)diphenyl.

References Cited

UNITED STATES PATENTS

| 386,192 | 7/1888 | Forel | 260—180 |
| 1,448,432 | 3/1923 | Clavel | 8—39 |
| 3,186,787 | 6/1965 | Gies et al. | 8—41 |
| 3,297,677 | 1/1967 | Pizzarello et al. | 8—41 X |

J. TRAVIS BROWN, *Primary Examiner.*

T. J. HERBERT, JR., *Assistant Examiner.*

U.S. Cl. X.R.

8—57, 55; 260—180